United States Patent Office 3,152,138
Patented Oct. 6, 1964

3,152,138
CERTAIN N-(HALOVINYLTHIO)IMIDES
Paul C. Aichenegg, Prairie Village, Kans., Carl D. Emerson, Kansas City, Mo., and Noel B. Jarnevic, Kansas City, Kans., assignors to Chemagro Corporation, New York, N.Y., a corporation of New York
No Drawing. Filed May 29, 1962, Ser. No. 198,431
7 Claims. (Cl. 260—301)

This invention relates to novel sulfenylated cyclic imides and their use as pesticides.

It is an object of the present invention to prepare novel halovinylthio cyclic imides.

Another object is to prepare novel haloethylthio cyclic imides.

An additional object is to prepare novel halovinylthio cyclic sulfenimides and haloethylthio cyclic sulfenimides.

A further object is to develop a novel method of killing nematodes.

Yet another object is to develop a novel method of killing fungi.

Still further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

It has been found that these objects can be attained by preparing compounds having one of the formulae

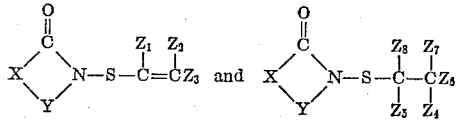

where X is selected from the group consisting of $$-C_2H_4-, \quad -C_3H_6-$$

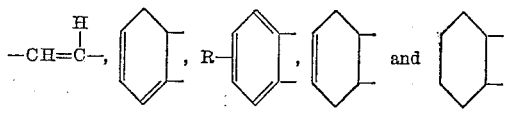

Y is selected from the group consisting of

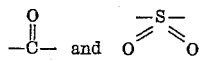

except that when X is $-C_3H_6-$ Y is not

two of $Z_1$, $Z_2$ and $Z_3$ are halogen of atomic weight 35 to 80, i.e. chlorine or bromine, and the other member of $Z_1$, $Z_2$ and $Z_3$ is hydrogen, 3 to 4 members of $Z_4$, $Z_5$, $Z_6$, $Z_7$ and $Z_8$ are halogen of atomic weight 35 to 80 and the remaining members of $Z_4$, $Z_5$, $Z_6$, $Z_7$ and $Z_8$ are hydrogen and R is lower alkyl, chloro, bromo or nitro. It has not been possible to prepare a compound where X is $-C_3H_6-$ and Y is

and this is the reason such combination is excluded. It has been found that more effective nematocides, fungicides and bactericides can be obtained when only two of $Z_1$, $Z_2$ and $Z_3$ are halogen rather than when all three of $Z_1$, $Z_2$ and $Z_3$ are halogen.

Illustrative of compounds according to the present invention are

N-(1,2-dichlorovinylthio) phthalimide,
N-(2,2-dichlorovinylthio) phthalimide,
N-(1,2,2-trichloroethylthio) phthalimide,
N-(2,2,2-trichloroethylthio) phthalimide,
N-(1,2-dibromovinylthio) phthalimide,
N-(2,2-dibromovinylthio) phthalimide,
N-(1-chloro-2-bromovinylthio) phthalimide,
N-(1,2,2-tribromoethylthio) phthalimide,
N-(1,2,2,2-tetrachloroethylthio) phthalimide,
N-(1,2-dichloro-2-bromoethylthio) phthalimide,
N-(1,2-dichlorovinylthio)-3'-methylphthalimide,
N-(2,2-dichlorovinylthio)-4'-butylphthalimide,
N-(1,2,2-trichloroethylthio)-3'-ethylphthalimide,
N-(2,2,2-trichloroethylthio) phthalimide,
N-(1,2-dichlorovinylthio)-3'-chlorophthalimide,
N-(2,2-dichlorovinylthio)-3'-bromophthalimide,
N-(1,2,2-trichloroethylthio)-3'-chlorophthalimide,
N-(2,2,2-trichloroethylthio)-4'-chlorophthalimide,
N-(1,2-dichlorovinylthio)-3'-nitrophthalimide,
N-(1,2-dichlorovinylthio)-cis-Δ⁴-tetrahydrophthalimide,
N-(2,2-dichlorovinylthio)-cis-Δ⁴-tetrahydrophthalimide,
N-(1,2,2-trichloroethylthio)-cis-Δ⁴-tetrahydrophthalimide,
N-(2,2,2-trichloroethylthio)-cis-Δ⁴-tetrahydrophthalimide,
N-(1,2,2,2-tetrachloroethylthio)-cis-Δ⁴-tetrahydrophthalimide,
N-(1,2-dibromovinylthio)-cis-Δ⁴-tetrahydrophthalimide,
N-(1,2-dichlorovinylthio)-o-benzoic sulfimide

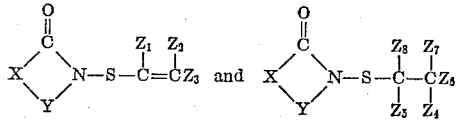

N-(2,2-dichlorovinylthio)-o-benzoic sulfimide,
N-(1,2,2-trichloroethylthio)-o-benzoic sulfimide,
N-(2,2,2-trichloroethylthio)-o-benzoic sulfimide,
N-(1,2,2,2-tetrachloroethylthio)-o-benzoic sulfimide,
N-(1,2-dichlorovinylthio)-cis-Δ⁴-tetrahydro-o-benzoic sulfimide,
N-(2,2-dichlorovinylthio)-cis-Δ⁴-tetrahydro-o-benzoic sulfimide,
N-(1,2,2-trichloroethylthio)-cis-Δ⁴-tetrahydro-o-benzoic sulfimide

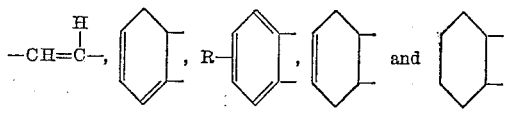

N-(1,2-dichlorovinylthio) succinimide,
N-(2,2-dichlorovinylthio) succinimide,
N-(1,2,2-trichloroethylthio) succinimide,
N-(2,2,2-trichloroethylthio) succinimide,
N-(1-bromo-2,2-dichloroethylthio) succinimide,
N-(1,2-dichlorovinylthio)-2-propionic sulfimide

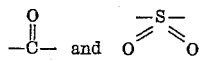

N-(2,2-dichlorovinylthio)-2-propionic sulfimide,
N-(1,2,2-trichloroethylthio)-2-propionic sulfimide,
N-(2,2,2-trichloroethylthio)-2-propionic sulfimide, N-(1,2,2,2-tetrachloroethylthio) succinimide,
N-(1,2-dichlorovinylthio) glutarimide,
N-(2,2-dichlorovinylthio) glutarimide,
N-(1,2,2-trichloroethylthio) glutarimide,
N-(2,2,2-trichloroethylthio) glutarimide,
N-(1,2-dichlorovinylthio) maleimide,
N-(2,2-dichlorovinylthio) maleimide,
N-(1,2,2-trichloroethylthio) maleimide,
N-(2,2,2-trichloroethylthio) maleimide,
N-(1,2,2,2-tetrachloroethylthio) maleimide,
N-(1,2-dichlorovinylthio)-2-acrylic sulfimide,
N-(2,2-dichlorovinylthio)-2-acrylic sulfimide,
N-(1,2,2-trichloroethylthio) maleimide,
N-(2,2,2-trichloroethylthio) maleimide,
N-(2,2-dibromovinylthio)-o-benzoic sulfimide,
N-(1,2,2-tribromoethylthio)-cis-$\Delta^4$-tetrahydro-o-benzoic sulfimide,
N-(1,2-dibromovinylthio) succinimide,
N-(1,2-dichlorovinylthio) hexahydro-o-benzoic sulfimide,
N-(1,2,2-trichloroethylthio) hexahydro-o-benzoic sulfimide,
N-(2,2-dibromovinylthio) maleimide,
N-(1,2-dichlorovinylthio) hexahydrophthalimide,
N-(2,2-dichlorovinylthio) hexahydrophthalimide,
N-(1,2,2-tribromoethylthio)-2-propionic sulfimide,
N-(1,2,2-trichloroethylthio) hexahydrophthalimide,
N-(2,2,2-trichloroethylthio) hexahydrophthalimide.

The compounds of the present invention are good nematocides and fungicides and in some instances are good bactericides.

The compounds of the present invention are prepared by reacting the appropriate alkali salt of the imide with the appropriate sulfenyl chloride to split out alkali metal chloride as the by-product. The alkali salt of the imide can be prepared by reacting an alkali metal alkoxide, e.g. sodium ethoxide, potassium ethoxide, sodium methoxide, potassium butoxide. Thus tetrahydrophthalimide (or succinimide) can be mixed with a slight excess of sodium ethoxide solution in absolute ethanol, the mixture filtered and the obtained crystalline imide salt dried over phosphorus pentoxide for 48 hours. Some of the alkali metal salts of the imides, e.g. potassium phthalimide and sodium o-benzoic sulfimide are commercially available.

Examples of suitable starting imide salts are potassium phthalimide, sodium phthalimide, potassium-3-methylphthalimide, sodium-4-butylphthalimide, potassium-3-ethylphthalimide, sodium-3-chlorophthalimide, potassium-3-bromophthalimide, potassium-4-chlorophthalimide, sodium-4-nitrophthalimide, potassium-cis-$\Delta^4$-tetrahydrophthalimide, sodium-o-benzoic sulfimide, potassium-cis-$\Delta^4$-tetrahydro-o-benzoic sulfimide, potassium succinimide, sodium 2-propionic sulfimide, potassium glutarimide, sodium maleimide, potassium-2-acrylic sulfimide, sodium hexahydrophthalimide and potassium hexahydro-o-benzoic sulfimide.

As the starting sulfenyl chlorides there can be used 1,2-dichlorovinyl sulfenyl chloride, 2,2-dichlorovinyl sulfenyl chloride, 1,2-dibromovinyl sulfenyl chloride, 2,2-dibromovinyl sulfenyl chloride, 1-chloro-2-bromovinyl sulfenyl chloride, 1,2,2-trichloroethyl sulfenyl chloride, 2,2,2-trichloroethyl sulfenyl chloride, 1,2,2,2-tetrachloroethyl sulfenyl chloride, 2,2,2-tribromoethyl sulfenyl chloride, 1,2,2-tribromoethyl sulfenyl chloride, and 1,2-dichloro-2-bromoethyl sulfenyl chloride.

The reaction between the alkali salt of the imide and the sulfenyl chloride is preferably carried out in suspension in an inert solvent at or below room temperature. Thus 1 part of alkali imide salt is suspended in 4 to 8 parts by weight of a solvent such as chloroform or carbon tetrachloride and reacted with stirring and cooling with slightly less than an equimolar amount of the dichlorovinyl or trichloroethyl sulfenyl chloride at 5–10° C. by dropwise addition of the latter at a rate to insure a smooth reaction. After stirring of the reaction mixture for an hour at room temperature, filtering (or alternatively washing the obtained suspension with water to remove unreacted alkali imide as well as alkali chloride) drying of the organic solution over anhydrous magnesium sulfate and stripping, the obtained crude product is recrystallized.

Alternatively the imides of the present invention can be prepared by reacting a free imide, e.g. succinimide, with the sulfenyl chloride in the presence of a tertiary amine, e.g. trialkyl amines such as trimethyl amine, triethyl amine and tributyl amine and heterocyclic amines such as pyridine. Thus there can be used equimolar amounts of the free imide and pyridine in 4 to 8 parts of chloroform or carbon tetrachloride per part of free imide and the calculated amount of sulfenyl chloride added. The unreacted pyridine is removed by washing with dilute mineral acid followed by washing with water and sodium bicarbonate solution in order to completely remove unreacted imide and pyridine hydrochloride. The product is dried and stripped of the organic solvent and purified by conventional procedures.

The dichlorovinyl sulfenimides of the present invention can also be formed by dehydrochlorination of the corresponding trichloroethyl compounds, e.g. in the presence of a tertiary amine such as triethyl amine.

Unless otherwise indicated all parts and percentages are by weight.

EXAMPLE 1

N-(1,2-dichlorovinylthio) phthalimide. 11.4 grams (0.061 mole) of dry potassium phthalimide (0.2% water) suspended in about 6 parts of chloroform per part of potassium phthalimide were reacted in the manner described at 5–10° C. with about 10 grams (0.060 mole) of 1,2-dichlorovinyl sulfenyl chloride which was added dropwise. The resulting mixture was filtered and 1 volume of petroleum ether was added to 1 volume of the chloroform solution. The precipitate formed contained the desired N-(1,2-dichlorovinylthio) phthalimide and a small amount of unreacted phthalimide starting material. Stripping of the chloroform-petroleum ether solution gave 5 grams (30% yield) of the desired product as a white solid, M.P. 137–139° C., Cl 25.0% (theory 25.8%); N 5.7% (theory 5.1%); S 11.7% (theory 11.7%). Recrystallization from ethyl alcohol to remove the small amount of impurity present gave the desired N-(1,2-dichlorovinylthio) phthalimide in pure form M.P. 153–154° C., Cl 25.2%; S 12.0%; N 4.9%.

The low yield in this example was due to (1) the failure to work up the potassium chloride which was first filtered off and contained a considerable amount of the desired product and (2) the failure to include the precipitate formed upon the addition of petroleum ether to the filtrate. As indicated substantially all of the latter material was the desired N(1,2-dichlorovinylthio) phthalimide.

EXAMPLE 2

N-(1,2-dichlorovinylthio)-cis-$\Delta^4$-tetrahydrophthalimide. 10.6 grams (0.061 mole) of dry sodium tetrahydrophthalimide (0.1% water) were suspended in about 6 parts of carbon tetrachloride per part of sodium tetrahydrophthalimide and reacted at 5–10° C. in the manner described above with 10 grams (0.060 mole) of 1,2-dichlorovinyl sulfenyl chloride. Filtration of the reaction mixture to remove sodium chloride, and stripping of solvent from the filtrate gave 15.5 grams (91% yield) of crude N-(1,2-dichlorovinylthio)-cis-$\Delta^4$-tetrahydrophthalimide as a thick, faintly yellow oil which solidified on prolonged standing. Recrystallization from ethanol gave white needles of the desired product, M.P. 101–102° C., Cl 27.8% (theory 25.5%); S 12.1% (theory 11.5%); N 4.6% (theory 5.0%).

EXAMPLE 3

N-(1,2-dichlorovinylthio)-o-benzoic sulfimide. 12.6 grams (0.078 mole) of sodium o-benzoic sulfimide (containing 5.6% water) were suspended in about 6 parts of carbon tetrachloride per part of sodium o-benzoic sulfimide and reacted in the manner described above at 5–10° C. with 10 grams (0.060 mole) of 1,2-dichlorovinyl sulfenyl chloride. The mixture obtained was washed with water and filtered. There was obtained 15 grams of insoluble material which was taken up into benzene, dried over magnesium sulfate and reobtained after stripping off the solvent as crude N-(1,2-dichlorovinylthio)-o-benzoic sulfimide in a yield of 15 grams (80% yield) as a faintly yellow solid, M.P. 99–100° C. Washing twice with ethyl alcohol gave the pure product as a white solid, M.P. 123–124° C., Cl 22.6% (theory 22.9%); S 21.0% (theory 20.6%); N 4.4% (theory 4.5%).

EXAMPLE 4

N - (1,2 - dichlorovinylthio) succinimide. 10 grams (0.060 mole) of 1,2-dichlorovinyl sulfenyl chloride and 4.85 grams (0.060 mole) of pyridine were added simultaneously by means of two separate dropping funnels to a well stirred suspension of 12.2 grams (0.12 mole, i.e. 1 mole excess) of succinimide at 25–30° C., during a period of 20 minutes. The rate of addition of the sulfenyl chloride was adjusted so as to guarantee a slight excess of the latter over the simultaneously added pyridine in the reaction mixture. Stirring for an additional 1.5 hours, shaking with an equal volume of water and filtration of the total mixture gave 7 grams (50% yield) of crude N-(1,2-dichlorovinylthio) succinimide which was further purified by dissolving in chloroform, washing the solution twice with water, drying the organic layer over anhydrous magnesium sulfate and stripping off the solvent. The desired product was obtained as an off white solid in an amount of 6.5 grams (46% yield) with a M.P. of 155–156° C. This product was further purified by taking it up in chloroform and precipitating it with petroleum ether to give white crystals M.P. 159–160° C., Cl 31.8% (theory 31.4%); S 14.3% (theory 14.2%).

EXAMPLE 5

N-(2,2-dichlorovinylthio) phthalimide. 12.0 grams (0.065 mole) of dry potassium phthalimide were suspended in about 6 parts of carbon tetrachloride per part of potassium phthalimide and reacted in the manner described above at 5–10° C., with 10 grams (0.060 mole) of 2,2-dichlorovinyl sulfenyl chloride. The resulting suspension was washed with water to remove potassium chloride and excess potassium phthalimide. The organic layer was dried over anhydrous magnesium sulfate and stripped of solvent to give 14.0 grams (84% yield) of N-(2,2-dichlorovinylthio) phthalimide as a white crystalline solid M.P. 147–148° C., Cl 27.6% (theory 25.8%); S 11.4% (theory 11.7%); N 4.8% (theory 5.1%). The product was further purified by recrystallization from ethyl alcohol, carbon tetrachloride and acetone. The recrystallized product from acetone was the best and had a M.P. of 152–153° C., Cl 26.2%; N 4.9%.

EXAMPLE 6

N - (2,2 - dichlorovinylthio)-cis-$\Delta^4$-tetrahydrophthalimide. 11.1 grams (0.064 mole) of dry sodium tetrahydrophthalimide suspended in 6 parts of chloroform per part of sodium tetrahydrophthalimide were reacted with 10 grams (0.060 mole) of 2,2-dichlorovinyl sulfenyl chloride at 5–10° C., in the manner described above. The insolubles were removed by filtration and the solvent stripped off to give 18 grams (100% yield) of N-(2,2-dichlorovinylthio)-cis-$\Delta^4$-tetrahydrophthalimide as a faintly yellow syrup which solidified on prolonged standing. The product was recrystallized from ethyl alcohol to give white needles M.P. 96–97° C., Cl 27.8% (theory 25.5%); S 11.7% (theory 11.5%); N 5.3% (theory 5.1%).

EXAMPLE 7

N - (2,2-dichlorovinylthio)-o-benzoic sulfimide. 10.25 grams (0.05 mole) of sodium o-benzoic sulfimide were suspended in 6 parts of chloroform per part of sodium o-benzoic sulfimide and reacted in the manner described above at 5–10° C. with 8.15 grams (0.05 mole) of 2,2-dichlorovinyl sulfenyl chloride to give a suspension of sodium chloride in a chloroform solution of N-(2,2-dichlorovinylthio)-o-benzoic sulfimide. This mixture was washed with water, dried and the solvent stripped off. After washing the residue with petroleum ether there were obtained 15 grams (97% yield) of the desired compound as a white crystalline solid, M.P. 122–123° C., Cl 23.0% (theory 23.2%); S 20.7% (theory 20.9%).

EXAMPLE 8

N - (2,2-dichlorovinylthio) succinimide. 7.9 grams (0.065 mole) of dry sodium succinimide were suspended in 6 parts of chloroform per part of sodium succinimide and reacted under the conditions set forth above at 5–10° C. with 10 grams (0.060 mole) of 2,2-dichlorovinyl sulfenyl chloride to give 14 grams (100% yield) of N-(2,2-dichlorovinylthio) succinimide after removal of the sodium chloride by filtration followed by stripping off of the organic solvent. The product was a white crystalline solid which could be recrystallized from ethyl alcohol, M.P. 158–159° C., Cl 31.6% (theory 31.4%); S 14.2% (theory 14.2%); N 6.5% (theory 6.2%).

EXAMPLE 9

N - (1,2,2-trichloroethylthio) phthalimide. 13.9 grams (0.075 mole, a ½ mole excess) of potassium phthalimide in 6 parts of chloroform per part of potassium phthalimide were treated with 10.0 grams (0.05 mole) of 1,2,2-trichloroethyl sulfenyl chloride at 5–10° C. in the manner described above. A suspension resulted. This suspension was mixed with water, the water layer removed and all insolubles filtered off. The organic layer was dried and stripped of solvent to give 12.0 grams (77% yield) of N-(1,2,2-trichloroethylthio) phthalimide as an almost white crystalline solid which could be recrystallized from ethyl alcohol, M.P. 111–112° C., Cl 34.2% (theory 34.2%); S 10.5% (theory 10.3%); N 5.1% (theory 4.5%).

The reported yield can be increased by recovering the desired product which was removed by the initial filtration.

EXAMPLE 10

N - (1,2,2 - trichloroethylthio)-cis-$\Delta^4$-tetrahydrophthalimide. 13.0 grams (0.075 mole, a ½ mole excess) of sodium tetrahydrophthalimide suspended in 6 parts of chloroform per part of sodium tetrahydrophthalimide were reacted in the manner described above with 10.0 grams (0.05 mole) of 1,2,2-trichloroethyl sulfenyl chloride at 5–10° C. After washing with water, drying over magnesium sulfate and stripping off the chloroform solution there was obtained 15.0 grams (95% yield) of the N-(1,2,2 - trichloroethylthio) - cis-$\Delta^4$-tetrahydrophthalimide as a white crystalline solid, which was recrystallized from ethyl alcohol, M.P. 91–92° C., Cl 34.1% (theory 33.8%); S 10.8% (theory 10.2%).

EXAMPLE 11

N - (1,2,2-trichloroethylthio)-o-benzoic sulfimide. 20.5 grams (0.1 mole) of sodium o-benzoic sulfimide suspended in 6 parts of chloroform per part of sodium o-benzoic sulfimide were treated with 20.0 grams (0.1 mole) of 1,2,2-trichloroethyl sulfenyl chloride at 5–10° C., and worked up in the manner previously described to give 31 grams (89.5%) of N-(1,2,2-trichloroethylthio)-o-benzoic sulfimide as a white crystalline solid, M.P. 108–109° C. This product was recrystallized from carbon tetrachloride to a M.P. 109–110° C., Cl 30.1% (theory 30.8%); S 17.9% (theory 18.5%); N 4.3% (theory 4.1%).

EXAMPLE 12

N - (2,2,2-trichloroethylthio) phthalimide. 18.5 grams (0.1 mole, a 1 mole excess) of potassium phthalimide was suspended in 6 parts of chloroform per part of potassium phthalimide and reacted in the manner described above with 10.0 grams (0.05 mole) of 2,2,2-trichloroethyl sulfenyl chloride at 5–10° C. After removing the excess unreacted imide salt and potassium chloride by washing with water, drying and stripping off the chloroform there was obtained 13.5 grams (87% yield) of N-(2,2,2-trichloroethylthio) phthalimide as a white crystalline residue, M.P. 169–170° C. The product could be recrystallized from ethyl alcohol, carbon tetrachloride-chloroform (1:1 by volume) or preferably from acetone with a M.P. of 183–184° C., Cl 34.0% (theory 34.2%); S 9.7% (theory 10.3%); N 4.04% (theory 4.45%).

EXAMPLE 13

N-(2,2,2-trichloroethylthio) - cis - $\Delta^4$-tetrahydrophthalimide. 9.1 grams (0.053 mole) sodium tetrahydrophthalimide were suspended in 6 parts of carbon tetrachloride per part of sodium tetrahydrophthalimide and reacted in the manner set forth above with 10.0 grams (0.05 mole) of 2,2,2-trichloroethyl sulfenyl chloride at 5–10° C. The resulting mixture was shaken with an equal volume of water and all insoluble material collected on the filter. The insolubles were taken up in benzene, washed with water, dried over magnesium sulfate and the solvent evaporated to give 11.0 grams (70% yield) of N-(2,2,2-trichloroethylthio)-cis-$\Delta^4$-tetrahydrophthalimide as a white crystalline residue. After washing with a light petroleum ether fraction and vacuum drying the product had a M.P. of 142–143° C. Recrystallization can be accomplished from much ethyl alcohol or little acetone or chloroform-carbon tetrachloride (1:3 by volume) to give a M.P. of 143–144° C., Cl 33.3% (theory 33.8%); S 10.5% (theory 10.2%); N 4.31% (theory 4.45%).

EXAMPLE 14

N-(2,2,2-trichloroethylthio)-o-benzoic sulfimide. 20.5 grams (0.1 mole) of sodium o-benzoic sulfimide were suspended in 6 parts of chloroform per part of sodium o-benzoic sulfimide and reacted in the manner set forth above with 10 grams (0.05 mole) of 2,2,2-trichloroethyl sulfenyl chloride at 5–10° C. Washing with water to remove excess unreacted imide salt, drying and stripping off the chloroform yielded 16.5 grams (95% yield) of N-(2,2,2-trichloroethylthio)-o-benzoic sulfimide as a white crystalline solid, M.P. 112–113° C. The latter could be recrystallized from ethyl alcohol, acetone or carbon tetrachloride, M.P. 113–114° C., Cl 31.1% (theory 30.5%); S 18.5% (theory 18.5%); N 3.7% (theory 4.0%).

EXAMPLE 15

N-(2,2,2-trichloroethylthio) succinimide. 4.95 grams (0.05 mole) of succinimide and 3.95 grams (0.05 mole) of pyridine in 50 ml. of chloroform were treated with 10.0 grams (0.05 mole) of 2,2,2-trichloroethyl sulfenyl chloride at 20–30° C., and then warmed at 50° C. for 0.5 hours to give a clear solution. This was washed with water three times, dried and stripped of solvents to give 5.0 grams (38% yield) of N-(2,2,2-trichloroethylthio) succinimide as an off white solid, M.P. 101–103° C., Cl 41.6% (theory 40.5%); S 12.7% (theory 12.2%); N 5.3% (theory 5.3%).

EXAMPLE 16

N-(2,2,2-trichloroethylthio) succinimide. 6.7 grams (0.055 mole) of sodium succinimide were suspended in 6 parts of chloroform per part of sodium succinimide and reacted with 10 grams (0.05 mole) of 2,2,2-trichloroethyl sulfenyl chloride at 5–10° C. in the manner described above. After filtration and evaporation of the clear filtrate 13.0 grams (99.5% yield) of crude N-(2,2,2-trichloroethylthio) succinimide M.P. 104–105° C. was obtained. Two recrystallizations from carbon tetrachloride gave the purified product M.P. 108–109° C., Cl 40.8%; S 13.0%; N 5.1%.

EXAMPLE 17

N-(2,2,2-dichlorovinylthio) succinimide. 5.0 grams (0.019 mole) of N-(2,2,2-trichloroethylthio) succinimide prepared in Example 16 were dissolved in 25 ml. of chloroform and dehydrochlorinated with stirring by dropwise addition at room temperature of 2.0 grams (0.02 mole, a slight excess) of triethyl amine. The reaction was exothermic and the temperature of the mixture was kept between 35–40° C. by occasional cooling with a cold water bath. The product was stirred for 1.5 hours at room temperature (25–28° C.), 50 ml. of chloroform added to dissolve the precipitate formed, the clear chloroform solution washed successively with water, dilute hydrochloric acid and water, dried over anhydrous magnesium sulfate and the organic layer stripped of solvent to give 4.0 grams (93% yield) of crude N-(2,2-dichlorovinylthio) succinimide as a light-yellowish crystalline solid, M.P. 135–137° C. This was recrystallized from ethyl alcohol to give white shiny plates, M.P. 159–160° C. which was identical with the product of Example 8, Cl 31.8%, S 15.7%, N 5.9%.

Chloroform proved to be a better solvent for the process than carbon tetrachloride since the desired products were much more soluble in the chloroform.

As previously indicated the compounds of the present invention are useful as nematocides and fungicides and in some cases as bactericides.

The compounds of the present invention can be used alone as nematocides, fungicides and bactericides but it has been found desirable to apply them to the pest, e.g. to the soil habitat of nematodes, together with inert solids to form dusts or, more preferably, suspended in a suitable liquid diluent, preferably water. They can be applied at widely varying rates, e.g. 0.1–30 lbs./acre.

There can also be added surface active agents or wetting agents and inert solids in such liquid formulations. Desirably, 0.05–1% by weight of surface active or wetting agent is employed. The active ingredient can be from 0.01 to 95% by weight of the entire composition in such case.

In place of water there can be employed organic solvents as carriers, e.g., hydrocarbons such as benzene, toluene, xylene, kerosene, diesel oil, fuel oil, and petroleum naphtha, ketones such as acetone, methyl ethyl ketone and cyclohexanone, chlorinated hydrocarbons such as carbon tetrachloride, chloroform, trichloroethylene and perchloroethylene, esters such as ethyl acetate, amyl acetate and butyl acetate, ethers, e.g., ethylene glycol monomethyl ether and diethylene glycol monomethyl ether, alcohols, e.g., ethanol, methanol, isopropanol, amyl alcohol, ethylene glycol, propylene glycol, butyl carbitol acetate and glycerine. Mixtures of water and organic solvents, either as solutions or emulsions, can be employed.

The novel pesticides can also be applied as aerosols, e.g., by dispersing them in air by means of a compressed gas such as dichlorodifluoromethane or trichlorofluoromethane and other Freons, for example.

The pesticides of the present invention can also be applied with nematocidal, fungicidal and bactericidal adjuvants or carriers such as talc, pyrophyllite, synthetic fine silica, attapulgus clay, kieselguhr, chalk, diatomaceous earth, lime, calcium carbonate, bentonite, fuller's earth, cottonseed hulls, wheat flour, soybean flour, pumice, tripoli, wood flour, walnut shell flour, redwood flour and lignin.

It is frequently desirable to incorporate a surface active agent in the pesticidal compositions of the present invention. Such surface active or wetting agents are advantageously employed in both the solid and liquid compositions. The surface active agent can be anionic, cationic or nonionic in character.

Typical classes of surface active agents include alkyl sulfonate salts, alkylaryl sulfonate salts, alkyl sulfate salts, alkylamide sulfonate salts, alkylaryl polyether alcohols, fatty acid esters of polyhydric alcohols and the alkylene oxide addition products of such esters, and addition products of long chain mercaptans and alkylene oxides. Typical examples of such surface active agents include the sodium alkylbenzene sulfonates having 10 to 18 carbon atoms in the alkyl group, alkylphenol ethylene oxide condensation products, e.g., p-isooctylphenol condensed with 10 ethylene oxide units, soaps, e.g., sodium stearate and potassium oleate, sodium salt of propyl-naphthalene sulfonic acid, (di-2-ethylhexyl) ester of sodium sulfosuccinic acid, sodium lauryl sulfate, sodium salt of the sulfonated monoglyceride of cocoanut fatty acids, sorbitan sesquioleate, lauryl trimethyl ammonium chloride, octadecyl trimethyl ammonium chloride, octadecyl trimethyl ammonium chloride, polyethylene glycol lauryl ether, polyethylene esters of fatty acids and rosin acids, e.g., Ethofat 7 and 13, sodium N-methyl-N-oleyl-taurate, Turkey Red Oil, sodium dibutylnaphthalene sulfonate, sodium lignin sulfonate (Marasperse N), polyethylene glycol stearate, sodium dodecylbenzene sulfonate, tertiary dodecyl polyethylene glycol thioether (Nonionic 218), long chain ethylene oxide-propylene oxide condensation products, e.g., Pluronic 61 (molecular weight 1000), sorbitan sesquioleate, polyethylene glycol ester of tall oil acids, sodium octyl phenoxyethoxyethyl sulfate, tris (polyoxyethylene) sorbitan monosterate (Tween 60), sodium dihexyl sulfosuccinate.

The solid and liquid formulations can be prepared by any of the conventional procedures. Thus, the active ingredient can be mixed with the solid carrier in finely divided form in amounts small enough to preserve the free-flowing property of the final dust composition.

In the following examples or tables illustrating nematocidal and fungicidal activity the sulfenylated cyclic imides were formulated as wettable powders consisting of 50% of the sulfenylated cyclic imide, 46% ultra fine silica (Hi-Sil), 2% sodium lignin sulfonate and 2% Pluronic L-61 (polyethylene oxide-polypropylene oxide adduct, molecular weight about 1000). This wettable powder is hereinafter designated as Formulation A.

Formulation A was diluted with water to such an extent to give the final concentrations of the sulfenylated cyclic imide indicated in Table 1.

Table 1

| Compound | Percent Kill of Nematodes at Rates, p.p.m. | | | | |
|---|---|---|---|---|---|
| | 200 | 100 | 50 | 25 | 12.5 |
| $A_1SCCl=CHCl$ | 100 | 100 | 90 | 90 | 50 |
| $A_2SCCl=CHCl$ | 100 | 100 | 100 | 100 | 80 |
| $A_3SCCl=CHCl$ | 100 | 100 | 50 | 0 | 0 |
| $A_4SCCl=CHCl$ | 100 | 100 | 90 | 80 | 50 |
| $A_1SCH=CCl_2$ | 100 | 100 | 100 | 70 | 30 |
| $A_2SCH=CCl_2$ | 60 | 60 | 30 | 0 | 0 |
| $A_3SCH=CCl_2$ | 100 | 100 | 100 | 100 | 100 |
| $A_4SCH=CCl_2$ | 100 | 100 | 100 | 80 | 50 |
| $A_1SCHClCHCl_2$ | 100 | 100 | 80 | 80 | 80 |
| $A_2SCHClCHCl_2$ | 90 | 90 | 60 | 30 | 0 |
| $A_3SCHClCHCl_2$ | 100 | 100 | 80 | 40 | 20 |
| $A_1SCH_2CCl_3$ | 30 | 0 | 0 | 0 | 0 |
| $A_2SCH_2CCl_3$ | 80 | 40 | 0 | 0 | 0 |
| $A_3SCH_2CCl_3$ | 100 | 100 | 80 | 60 | 60 |
| $A_4SCH_2CCl_3$ | 100 | 100 | 80 | 80 | 50 |

Compound $A_3SCH=CCl_2$ was so outstanding that it was tested at lower dosages with the following results

| | Percent kill at— | | |
|---|---|---|---|
| | 6 p.p.m. | 3 p.p.m. | 1 p.p.m. |
| $A_3SCH=CCl_2$ | 50 | 20 | 0 |

In commercial practice the compositions containing the nematocides of the present invention are applied to the soil infected with nematodes.

The compounds were also tested as fungicides in plate fungicide tests against pythium spp., Rhizoctonia, Fusarium Helminthosporium and Stemphyllium as shown in Table 2. The compounds were made up into Formulation A and then added to agar culture of the fungi except for the test with Stemphyllium which was a slide germination test. In the table, 10 indicates 100% effectiveness and 0 indicates no effectiveness. The concentrations are expressed in p.p.m. (parts per million). The Stemphyllium results are qualitative only and hence instead of using the scale of 10 to 0 are recorded only as + for inhibition and 0 for no inhibition.

Table 2

| Compound | Pythium | | | Fusarium | | | Rhizoctonia | | | Helminth. | | | Stemphyllium | | |
|---|---|---|---|---|---|---|---|---|---|---|---|---|---|---|---|
| | 1,000 | 100 | 10 | 1,000 | 100 | 10 | 1,000 | 100 | 10 | 1,000 | 100 | 10 | 1,000 | 100 | 10 |
| $A_1SCCl=CHCl$ | 10 | 10 | 10 | 10 | 5 | 0 | 10 | 4 | 3 | 10 | 4 | 3 | ----- | 0 | 0 |
| $A_2SCCl=CHCl$ | 10 | 10 | 2 | 10 | 6 | 0 | 10 | 7 | 0 | 10 | 2 | 0 | ----- | + | 0 |
| $A_3SCCl=CHCl$ | 10 | 10 | 0 | 10 | 6 | 0 | 10 | 5 | 0 | 10 | 9 | 4 | ----- | 0 | 0 |
| $A_4SCCl=CHCl$ | 10 | 10 | 0 | 10 | 3 | 0 | 7 | 2 | 1 | 10 | 8 | 1 | ----- | 0 | 0 |
| $A_1SCH=CCl_2$ | 10 | 9 | ----- | 5 | 1 | 0 | 10 | 8 | 3 | 4 | 0 | ----- | + | 0 | ----- |
| $A_2SCH=CCl_2$ | 10 | 4 | ----- | 5 | 2 | ----- | 8 | 3 | ----- | 10 | 5 | ----- | 0 | 0 | ----- |
| $A_3SCH=CCl_2$ | 10 | 10 | ----- | 4 | 0 | ----- | 8 | 2 | ----- | 4 | 0 | ----- | + | + | ----- |
| $A_4SCH=CCl_2$ | 10 | 10 | ----- | 10 | 7 | ----- | 8 | 1 | ----- | 10 | 3 | ----- | ----- | ----- | ----- |
| $A_1SCHClCHCl_2$ | 8 | 3 | ----- | 2 | 0 | ----- | 5 | 2 | ----- | 0 | 0 | ----- | ----- | 0 | 0 |
| $A_2SCHClCHCl_2$ | 10 | 10 | 0 | 10 | 10 | 0 | 10 | 7 | 0 | 10 | 4 | 0 | ----- | 0 | 0 |
| $A_3SCHClCHCl_2$ | 10 | 10 | 0 | 10 | 7 | 0 | 10 | 8 | 0 | 10 | 7 | 0 | ----- | 0 | 0 |
| $A_1SCH_2CCl_3$ | 10 | 10 | ----- | 10 | 0 | ----- | 5 | 0 | ----- | 10 | 0 | ----- | ----- | 0 | 0 |
| $A_2SCH_2CCl_3$ | 10 | 10 | ----- | 10 | 1 | ----- | 6 | 1 | ----- | 5 | 2 | ----- | ----- | ----- | ----- |
| $A_3SCH_2CCl_3$ | 10 | 0 | ----- | 2 | 0 | ----- | 2 | 0 | ----- | 4 | 0 | ----- | ----- | ----- | ----- |
| $A_4SCH_2CCl_3$ | 10 | 10 | ----- | 10 | 5 | ----- | 10 | 7 | ----- | 10 | 10 | ----- | ----- | + | 0 |

The saprophytic nematode tests recorded in Table 1 were carried out in water as the medium with Panagrellus and Rhabditis spp. at room temperature. The results were recorded as percent kill after a 2-day incubation period. The blank mortality was 0–10% kill.

In all of the tables the following abbreviations are used $A_1$ for phthalimido
$A_2$ for $\Delta^4$-tetrahydrophthalimido
$A_3$ for o-benzoic-sulfimido
$A_4$ for succinimido Bactericide tests were run by incorporating the compounds in Formulation A and adding this mixture to an agar culture of the bacteria. The following positive bactericide actions were noted.

$A_1SCCl=CHCl$ against Erwin. Carotovora at 1000 p.p.m., $A_2SCCl=CHCl$ against *Pseudomonas coronafaciens* at 1000 p.p.m. and against *Xanthomonas vesicatoria* at 1000 p.p.m., $A_1SCH=CCl_2$ against each of Erwin. Carotovora;

*Pseudomonas coronafaciens* and *Xanthomonas vesicatoria* at 1000 p.p.m.,

A₃SCH=CCl₂ against Erwin. Carotovora at 1000 p.p.m. and 100 p.p.m. against *Pseudomonas coronafaciens* at 1000 p.p.m. and 100 p.p.m., and against *Xanthomonas vesicatoria* at 1000 p.p.m.

A₂SCH₂CCl₃ against Erwin. Carotovora at 1000 p.p.m., A₃SCH₂CCl₃ against *Pseudomonas coronafaciens* at 1000 p.p.m.

What is claimed is:
1. N-(dichlorovinylthio) phthalimide.
2. N-(1,2-dichlorovinylthio) phthalimide.
3. N-(dichlorovinylthio)-cis-Δ⁴-tetrahydrophthalimide.
4. N-(1,2-dichlorovinylthio)-cis-Δ⁴-tetrahydrophthalimide.
5. N-(dichlorovinylthio)-o-benzoic sulfimide.
6. N-(dichlorovinylthio) succinimide.
7. N-(2,2-dichlorovinylthio)-o-benzoic sulfimide.

References Cited in the file of this patent
UNITED STATES PATENTS

| | | |
|---|---|---|
| 2,553,770 | Kittleson | May 22, 1951 |
| 2,553,773 | Cohen | May 22, 1951 |
| 2,701,799 | D'Amico | Feb. 8, 1955 |
| 2,731,471 | Synerholm et al. | Jan. 17, 1956 |
| 2,856,410 | Kittleson et al. | Oct. 14, 1958 |
| 2,863,801 | Kuhle | Dec. 9, 1958 |
| 2,953,492 | Duggins | Sept. 20, 1960 |
| 3,026,245 | Cannon | Mar. 20, 1962 |
| 3,036,088 | Harris | May 22, 1962 |